United States Patent
Chen et al.

(10) Patent No.: US 9,411,867 B2
(45) Date of Patent: Aug. 9, 2016

(54) METHOD AND APPARATUS FOR PROCESSING DATABASE DATA IN DISTRIBUTED DATABASE SYSTEM

(71) Applicant: International Business Machines Corporation, Armonk, NY (US)

(72) Inventors: Guan Cheng Chen, Beijing (CN); Ju Wei Shi, Beijing (CN); Kun Wang, Beijing (CN); Ben Bo Yang, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 13/929,283

(22) Filed: Jun. 27, 2013

(65) Prior Publication Data
US 2014/0012810 A1    Jan. 9, 2014

(30) Foreign Application Priority Data
Jun. 29, 2012  (CN) .......................... 2012 1 0226720

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)

(58) Field of Classification Search
None
See application file for complete search history.

(56) References Cited

U.S. PATENT DOCUMENTS

| | | | |
|---|---|---|---|
| 6,470,344 B1 | 10/2002 | Kothuri et al. | |
| 8,108,399 B2 | 1/2012 | Dumitru et al. | |
| 8,732,517 B1* | 5/2014 | Stefani | G06F 11/00 707/610 |
| 2008/0306904 A1 | 12/2008 | Fukuda et al. | |
| 2011/0196822 A1* | 8/2011 | Zunger | G06F 17/30575 707/609 |
| 2011/0196827 A1* | 8/2011 | Zunger | 707/622 |
| 2011/0196838 A1* | 8/2011 | Zunger | G06F 17/30194 707/636 |
| 2011/0196882 A1* | 8/2011 | Kesselman | 707/753 |
| 2012/0150819 A1* | 6/2012 | Lindahl et al. | 707/687 |
| 2013/0346365 A1* | 12/2013 | Kan et al. | 707/610 |

FOREIGN PATENT DOCUMENTS

| | | |
|---|---|---|
| CN | 101866358 A | 10/2010 |
| WO | WO 2011/118425 A1 | 9/2011 |

OTHER PUBLICATIONS

Written Opinion of the International Searching Authority, PCT/CN2013/077244 mailed Aug. 15, 2013.

(Continued)

*Primary Examiner* — Robert Beausoliel, Jr.
*Assistant Examiner* — Michael Pham
(74) *Attorney, Agent, or Firm* — Scully, Scott, Murphy & Presser, P.C.; Jennifer Davis, Esq.

(57) ABSTRACT

A method and apparatus for processing database data in a distributed database system, wherein the distributed database system comprises a plurality of computing nodes communicatively coupled via computer networks, the method comprising: creating a plurality of different data replicas wherein each of the data replicas is created in the following way: sorting the database data according to at least one data attribute; generating a row key based on the at least one data attribute; and using the sorted database data with the row key as the data replica, storing different data replicas in different computing nodes; and creating an index for each of the data replicas according to its row key.

16 Claims, 8 Drawing Sheets

(56) References Cited

OTHER PUBLICATIONS

International Search Report, PCT/CN2013/077244 mailed Aug. 15, 2013.
Notification of Transmittal of the International Search Report and Written Opinion of the International Searching Authority, PCT/CN2013/077244 mailed Aug. 15, 2013.
"Study on P2P distributed database system", http://www.doc88.com/p-41795166338.html, English abstract only, printed on Apr. 7, 2016, 1 page.
"Study based on key techniques of Hadoop massive image data management", http://www.doc88.com/p-7498794502608.html, English abstract only, printed on Apr. 7, 2016, 1 page.

\* cited by examiner

| Device-id | Time | Temperature | Wind Speed | Humidity |
|---|---|---|---|---|
| 0001 | 2000.1.2 | 10 | 14 | |
| 0001 | 2000.1.1 | 11 | 12 | |
| 0001 | 2000.1.3 | 9 | 3 | |
| ... | ... | ... | ... | ... |
| 0001 | 2011.12.31 | 8 | 4 | 7 |
| 0002 | 2000.1.1 | 3 | 5 | 7 |
| ... | ... | ... | ... | ... |
| 0002 | 2011.12.31 | 2 | 2 | 12 |
| 0003 | 2000.1.1 | 4 | 7 | |
| ... | ... | ... | ... | ... |
| 0003 | 2011.12.31 | 7 | 10 | |
| 0004 | 2000.1.1 | 18 | 0 | 13 |
| ... | ... | ... | ... | ... |
| 0004 | 2011.12.31 | 17 | 1 | 5 |

300A

| Row Key,{<Key, Value>} |
|---|
| 0001,<Device-id ,0001>,<Time,2000.1.2>,<Temperature,10>,<Wind Speed,14> |
| 0001,<Device-id ,0001>,<Time,2000.1.1>,<Temperature,11>,<Wind Speed,12> |
| 0001,<Device-id ,0001>,<Time,2000.1.3>,< Temperature,9>,<Wind Speed,3> |
| ...... |
| 0001,<Device-id ,0001>,<Time,2011.12.31>,<Temperature,8>,<Wind Speed,4>,< Humidity,7> |
| 0002,<Device-id ,0002>,<Time,2000.1.1>,<Temperature,3>,<Wind Speed,5>,< Humidity,7> |
| ...... |
| 0002,<Device-id ,0002>,<Time,2011.12.31>,<Temperature,2>,<Wind Speed,2>,< Humidity,12 > |
| 0003,<Device-id ,0003>,<Time,2000.1.1>,<Temperature,4>,<Wind Speed,7> |
| ...... |
| 0003,<Device-id ,0003>,<Time,2011.12.31>,<Temperature,7>,<Wind Speed,10> |
| 0004,<Device-id ,0004>,<Time,2000.1.1>,<Temperature,18>,<Wind Speed,0>,< Humidity,13> |
| ...... |

| Row Key | Device-id | Time | Temperature | Wind Speed | Humidity |
|---|---|---|---|---|---|
| 0001_2000.1.1 | 0001 | 2000.1.1 | 10 | 14 | |
| 0001_2000.1.2 | 0001 | 2000.1.2 | 11 | 12 | |
| 0001_2000.1.3 | 0001 | 2000.1.3 | 9 | 3 | |
| ... | ... | ... | ... | ... | ... |
| 0001_2011.12.31 | 0001 | 2011.12.31 | 8 | 4 | 7 |
| 0002_2000.1.1 | 0002 | 2000.1.1 | 3 | 5 | 7 |
| ... | ... | ... | ... | ... | ... |
| 0002_2000.12.31 | 0002 | 2011.12.31 | 2 | 2 | 12 |

411

| Row Key | Device-id | Time | Temperature | Wind Speed | Humidity |
|---|---|---|---|---|---|
| 0003_2000.1.1 | 0003 | 2000.1.1 | 4 | 7 | |
| ... | ... | ... | ... | ... | ... |
| 0003_2011.12.31 | 0003 | 2011.12.31 | 7 | 10 | |
| 0004_2000.1.1 | 0004 | 2000.1.1 | 18 | 0 | 13 |
| ... | ... | ... | ... | ... | ... |
| 0004_2011.12.31 | 0004 | 2011.12.31 | 17 | 1 | 5 |
| | | | | | |

| Row Key | Device-id | Time | Temperature | Wind Speed | Humidity |
|---|---|---|---|---|---|
| 2000.1.1_0001 | 0001 | 2000.1.1 | 10 | 14 | |
| 2000.1.1_0002 | 0002 | 2000.1.1 | 3 | 5 | 7 |
| 2000.1.1_0003 | 0003 | 2000.1.1 | 4 | 7 | |
| 2000.1.1_0004 | 0004 | 2000.1.1 | 18 | 0 | 13 |
| 2000.1.2_0001 | 0001 | 2000.1.2 | 11 | 12 | |
| ... | ... | ... | ... | ... | ... |
| 2000.1.3_0001 | 0001 | 2000.1.3 | 9 | 3 | |
| ... | ... | ... | ... | ... | ... |

421

| Row Key | Device-id | Time | Temperature | Wind Speed | Humidity |
|---|---|---|---|---|---|
| ... | ... | ... | ... | ... | ... |
| 2011.12.31_0001 | 0001 | 2011.12.31 | 8 | 4 | 7 |
| 2011.12.31_0002 | 0002 | 2011.12.31 | 2 | 2 | 12 |
| 2011.12.31_0003 | 0003 | 2011.12.31 | 7 | 10 | |
| 2011.12.31_0004 | 0004 | 2011.12.31 | 17 | 1 | 5 |

| Row Key | Device-id | Time | Temperature | Wind Speed | Humidity |
|---|---|---|---|---|---|
| 2 | 0002 | 2011.12.31 | 2 | 2 | 12 |
| … | … | … | … | … | … |
| 3 | 0002 | 2000.1.1 | 3 | 5 | 7 |
| … | … | … | … | … | … |
| 4 | 0003 | 2000.1.1 | 4 | 7 | |
| … | … | … | … | … | … |
| 7 | 0003 | 2011.12.31 | 7 | 10 | |
| 8 | 0001 | 2011.12.31 | 8 | 4 | 7 |
| … | … | … | … | … | … |
| 9 | 0001 | 2000.1.3 | 9 | 3 | |
| … | … | … | … | … | … |

431

| Row Key | Device-id | Time | Temperature | Wind Speed | Humidity |
|---|---|---|---|---|---|
| … | … | … | … | … | … |
| 10 | 0001 | 2000.1.1 | 10 | 14 | |
| … | … | … | … | … | … |
| 11 | 0001 | 2000.1.2 | 11 | 12 | |
| … | … | … | … | … | … |
| 17 | 0004 | 2011.12.31 | 17 | 1 | 5 |
| … | … | … | … | … | … |
| 18 | 0004 | 2000.1.1 | 18 | 0 | 13 |
| … | … | … | … | … | … |

METHOD AND APPARATUS FOR PROCESSING DATABASE DATA IN DISTRIBUTED DATABASE SYSTEM

BACKGROUND ART

The present invention relates to distributed databases and, more particularly, to the processing of data of distributed databases.

Databases are widely applied to fields like e-business, social networking, internet searching and internet of things (IOT), etc. Databases include relational database and non-relational database. In a relational database, a table is a formatted data structure. The field composition is same for all tuples in a table. Although not all fields are needed for all tuples, the database will allocate all fields for each tuple. Such a structure may facilitate operations like linking one table with another.

A non-relational database stores information with tuples consisting of key-value pairs. Its structure is not fixed and different tuples may have different fields. Each tuple may have additional key-value pairs for itself on a need basis, thus it is not limited by a fixed structure. Therefore, non-relational databases have the feature of good scalability. Because of the feature, non-relational databases have also been developed rapidly.

Both relational databases and non-relational databases may store multi-dimensional data. Examples of multi-dimensional data include measurement data of sensors, such as temperature value and wind speed value measured at different points of time. In querying database, if a particular sensor and a time recorded by the particular sensor are to be queried simultaneously, the sensor's device-id and the time constitute a two-dimensional data. If a particular sensor and a time and a temperature recorded by the particular sensor are to be queried simultaneously, the sensor's device-id, the time and the temperature constitute a three-dimensional data.

In the prior art there exist techniques for processing multi-dimensional data, including techniques of indexing, storage and querying with respect to multi-dimensional data. However, when applying these techniques to process multi-dimensional data, extra computing resources need to be consumed for higher efficiency. With the rapid increase in the amount of database data processed by various applications, it is increasingly important to mitigate the contradiction.

SUMMARY OF THE INVENTION

In view of the prior art, one of the objectives of the present invention is to provide an improved method and apparatus for processing database data in distributed database systems.

In one aspect, it is disclosed method for processing database data in a distributed database system, wherein the distributed database system comprises a plurality of computing nodes communicatively coupled via computer networks, the method comprising: creating a plurality of different data replicas wherein each of the data replicas is created in the following way: sorting the database data according to at least one data attribute; generating a row key based on the at least one data attribute; and using the sorted database data with the row key as the data replica, storing different data replicas in different computing nodes; and creating an index for each of the data replicas according to its row key.

In another aspect, it is disclosed an apparatus for processing database data in a distributed database system, wherein the distributed database system comprises a plurality of computing nodes communicatively coupled via computer networks, the apparatus comprising: a data replica creation module configured to create a plurality of different data replicas wherein each of the data replicas is created in the following way: sorting the database data according to at least one data attribute; generating a row key based on the at least one data attribute; and using the sorted database data with the row key as the data replica, a replica storage module configured to store different data replicas in different computing nodes; and an index creation module configured to create an index for each of the data replicas according to its row key.

BRIEF DESCRIPTION OF THE DRAWINGS

The present disclosure of the above and other objects, features and advantages will become more apparent by the more detailed description of an exemplary embodiment of the present disclosure in conjunction with the accompanying drawings, wherein, in the present embodiment discloses an exemplary embodiment, the same reference numerals typically represent same member.

FIG. 3 illustratively depicts two examples of database data;

FIGS. 4A-4C illustratively depict data replicas in accordance with an embodiment of the present inventions;

DESCRIPTION OF THE PREFERRED EMBODIMENTS

Preferred embodiments of the present disclosure will be described in greater detail below with reference to the accompanying drawings. The accompanying drawings have shown those preferred embodiments of the present disclosure, however, it should be understood that, the present disclosure can be implemented in various forms, but are not limited to these embodiments illustrated herein. On the contrary, these embodiments are provided for making the present disclosure more thorough and complete, such that the scope of the present disclosure can be completely delivered to one of ordinary skill in the art.

Figure 1:
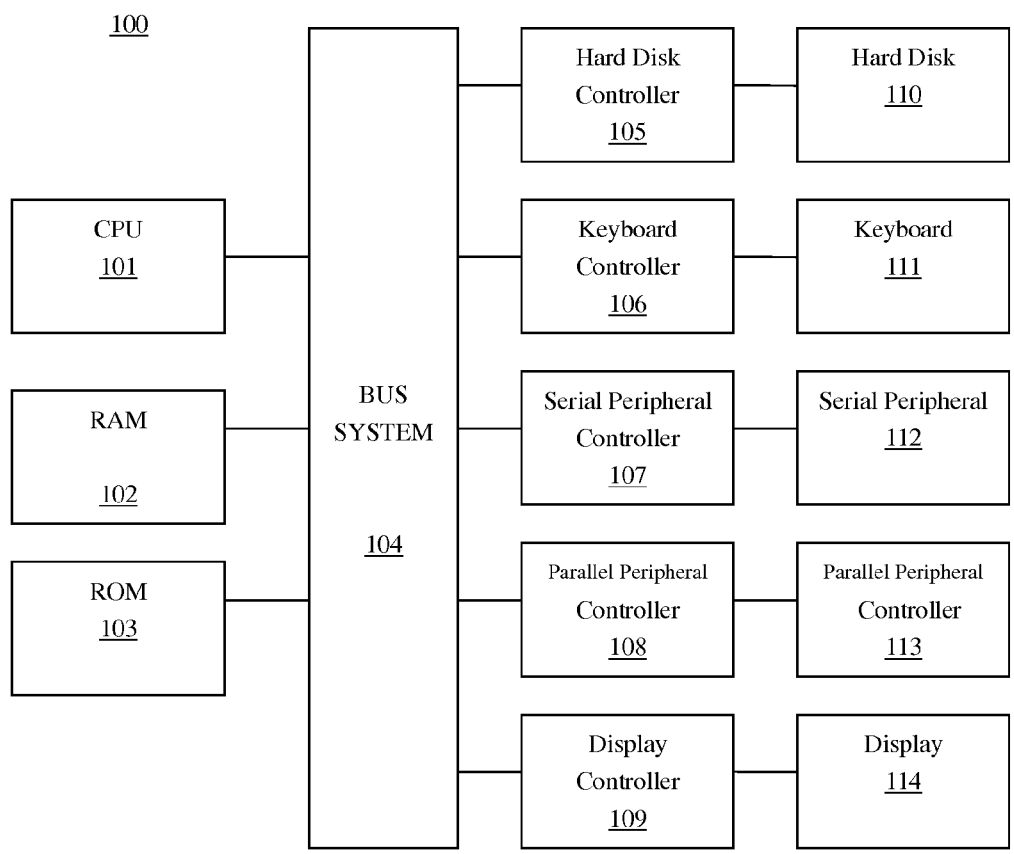
FIG. 1 depicts a block diagram of an exemplary computing system 100 adapted to be used to implement embodiments of the present invention.

FIG. 1 shows a block diagram of an exemplary computing system 100 which is applicable to implement the embodiments of the present invention. As shown in FIG. 1, the computing system 100 may include: CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention relates to the processing of database data in a distributed database system. A computing node in the distributed database system may be implemented by the computer system 100 shown in FIG. 1. The processing of database data and the application of database may also be performed on the computer system 100 shown in FIG. 1.

Those skilled in the art shall appreciate that data of a distributed database are physically dispersive and stored at different nodes (or "sites") of the distributed database system. The data on individual nodes communicatively connected via computer networks are under unified management of the distributed database management system. Therefore, the distributed database is logically a unified entirety, and applications may access to geographically distributed databases via network connections.

The distributed database stores multiple data replicas on multiple nodes, so that each data item has at least one copy stored on other nodes. For example, if there are two copies for a data item D1, namely data item D1_R1 and data item D1_R2, then D1, D1_R1 and D1_R2 shall be located at different nodes. It should be noted that, in the context of the present invention, the term "replica" is a relative concept. For example, in the above example, D1 and D1_R2 are also replicas of D1_R1, and D1 and D1_R1 are also replicas of D1_R2.

In short, data in a distributed database is redundant, which may increase the parallel degree of data usage and improve data availability in case of failure (for example, node failure or network failure) as well.

The general idea of the present invention is utilizing the data redundancy of the distributed database to process database data, so as to improve the efficiency in querying on database data without taking up additional computing resources.

Figure 2:
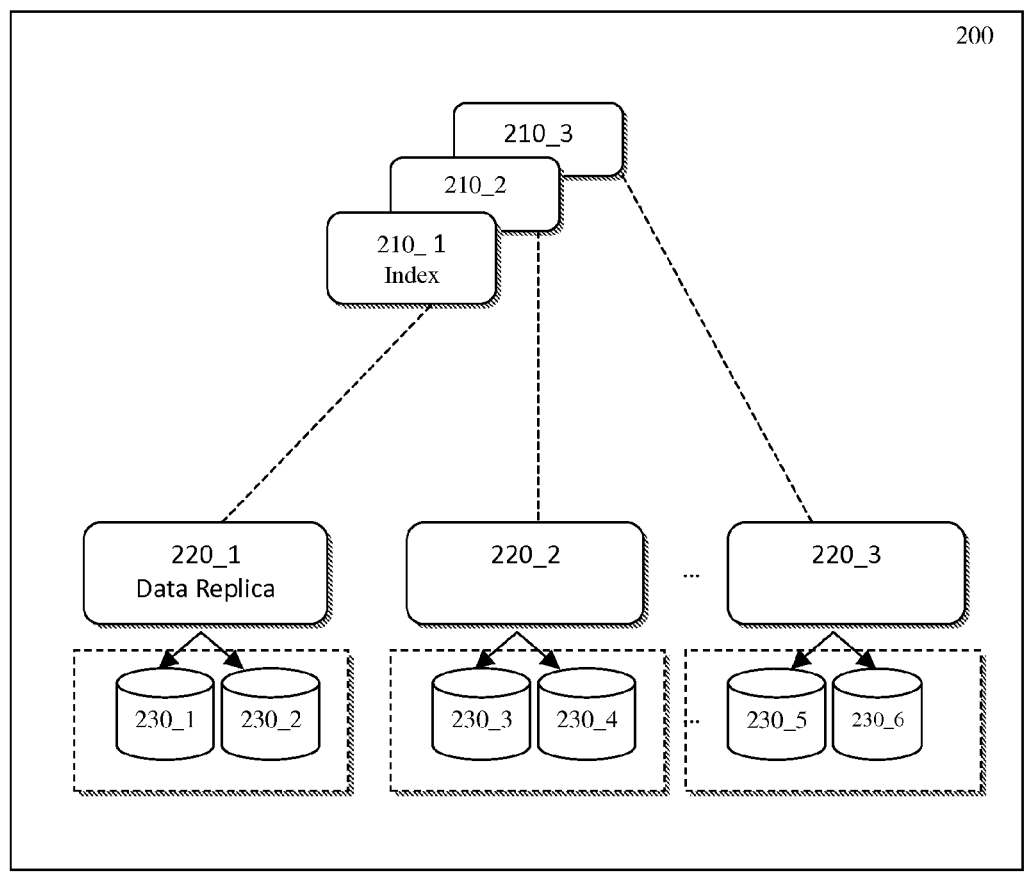
FIG. 2 illustratively depicts a distributed database system according to an embodiment of the present invention.

Refer first to FIG. 2, which illustratively shows a distributed database system 200 according to an embodiment of the present invention. As an example, the distributed database system 200 shown in FIG. 2 has three data replicas 220_1, 220_2, 220_3 of database data stored on six computing nodes, wherein the data replica 220_1 is stored on computing nodes 230_1 and 230_2, the data replica 220_2 is stored on computing nodes 230_3 and 230_4, and the data replica 220_3 is stored on computing nodes 230_5 and 230_6.

The computing nodes (hereinafter also briefly referred to as "node/nodes") may be implemented with the computer system 100 as shown in FIG. 1. Nodes may be communicatively coupled with each other via computer networks (not shown). In FIG. 2 it is shown six nodes, which is merely exemplary. In practice, there may be hundreds of nodes, and the number of nodes for storage of each data replica may also exceed two.

As shown, the data replicas 220_1, 220_2 and 220_3 respectively have a corresponding index 210_1, 210_2 and 210_3. According to an embodiment of the present invention, the index 210_1, 210_2 and 210_3 may be saved on other nodes, for example, on a master node (not shown) of the distributed database system.

It should be noted that in FIG. 2 it is only shown three data replicas (hereinafter also briefly referred to as "replica/replicas"), whereas the number of data replicas in an actual distributed database may be less (for example, two) or more than three.

According to an embodiment of the present invention, replicas 220_1, 220_2 and 220_3 all contain the same data items, but they are sorted in different ways.

According to an embodiment of the present invention, the multiple data replicas respectively have indices associated with sorting manners (also referred to as "index data") 210_1, 210_2 and 210_3. The indices may be saved (not shown) on the master node of the distributed database system master.

Features of the data replicas and indices shown in FIG. 2 will be described in detail below with reference to FIGS. 4A-4C and FIG. 5, and, with reference to FIG. 6, description will be provided on how to create the data replicas and indices shown in FIG. 2. Prior to that, the database that is applicable to the distributed database system 200 of the invention will be introduced first.

Refer to FIG. 3, which illustratively shows two examples of database data. The database data indicated by reference mark 300A is an example of relational database data. The data 300A record values of temperature, wind speed and humidity sampled by four sensor devices 0001-0004 during a period of 2000.1.1-2011.2.31. "Device-id", "Time", "Temperature", "Wind Speed" and "Humidity" in the first line are data attributes (briefly referred to as "attribute/attributes"). Other lines are all data tuples. Each field of a data tuple is an attribute value. For example, in the triple "0001,2011.12.31,8,4,7", the field "0001" is a value of the attribute "Device-id", which represents a sensor device identified by the Device-id of "0001".

The database data indicated by reference mark 300B is an example of non-relational database (e.g. NoSQL database) data. Each row in the data 300B represents a data tuple, and each data tuple includes a "Row Key" field and several fields each consisting of a "<Key,Value>" pair. For example, "0001, <Device-id, 0001>, <Time, 2011.12.31>, <Temperature, 8>, <Wind Speed, 4>, <Humidity, 7>" is a tuple. The field "0001" in the tuple is a value of row key. For example, the field "<Device_id, 0001>" indicates that the value of the attribute "Device_id" is "0001."

The data 300A and data 300B shown in FIG. 3 are exemplary only, and are used to represent the well-known relational database and non-relational database, respectively. The database data of the distributed database system shown in FIG. 2 may use the structure of the data 300A or the structure of the data 300B as well. For convenience of description, only the data 300B will be taken as the example for illustrating various embodiments of the present invention below. Apparently, for those skilled in the art who understand the relational database and the non-relational database, it would not be difficult to apply the various embodiments illustrated with the exemplary non-relational database data 300B to the relational database data depicted by the data 300A.

Below, with reference to FIGS. 4A-4C, details of the data replicas 220_1, 220_2 and 220_3 will be described.

FIG. 4A illustratively shows a data replica 410 created according to an embodiment of the invention.

Here it is assumed that the data replica 410 is used as the data replica 220_1 shown in FIG. 2. The data replica 220_1 is stored on nodes 230_1 and 230_2, so the replica 410 is divided into data sets 411 and 412 which respectively represent two parts of the data replica 220_1 stored in the nodes 230_1 and 230_2.

The data replica 410 is said to be derived from the database data 300B shown in FIG. 3. In other words, it is a data replica created for the database data 300B.

It is to be noted first that, for simplicity, the data replica 410 shown in FIG. 4A uses a representation that looks different from but is substantially same as that of the database data 300B.

For example, the representation of

| Row Key (Device-id_Time) | Device-id | Time | Temperature | Wind Speed | Humidity |
|---|---|---|---|---|---|
| 0001_2000.1.1 | 0001 | 2000.1.1 | 10 | 14 | | in the data replica 410 is equivalent to the following representation.

| Row Key (Device-id_Time), { Key, Value } |
|---|
| 0001_2000.1.1,<Device-id,0001>,<Time,2000.1.1>, <Temperature,10>,<Wind Speed,14> |

As will be described with reference to FIG. 6, the data replica 410 may be created for the database data 300B in the following manner.

The database data 300B is sorted according to attributes "Device-id" and "Time". The row key "Device-id_Time" is then generated based on the attributes "Device-id" and "Time". The database 300B thus sorted and having the generated row key "Device-id_Time" is used as the data replica 410.

In this example, multiple sorting is conducted on the database data 300B according to two attributes of "Device-id" and "Time". It is first sorted by the attribute "Device-id" and then by the attribute "Time". The concatenation of the attributes "Device-id" and "Time", "Device-id_Time", is used as the row key in place of the original row key "Device-id" of the database data 300B. For example, the first column of the data replica 410, "0001_2000.1.1", is a value of row key (Device-id_Time).

Because the data replica 410 is generated by multiple sorting on the data 300B, the date items or tuples in the data sets 411 and 412 are stored on the nodes 230_1 and 230_2 in accordance with the sorted order as sequentially as possible. For example, in the data set 411, tuples with the value of "Device-id" being "0001" will be stored continuously or adjacently in the memory of the node 230_1.

FIG. 4B schematically depicts another data replica 420 created according to an embodiment of the present invention.

Here it is assumed that the data replica 420 is used as the data replica 220_2 shown in FIG. 2. The data replica 220_2 is stored on nodes 230_3 and 230_4, so the replica 420 is divided into data sets 421 and 422, respectively representing two parts of the data replica 220_2 stored in the nodes 230_3 and 230_4.

The data replica 420 is represented by the same format as data replica 410, and it is another and different data replica created for the database data 300B. The method of creating the data replica 420 is similar to the creation of the data replica 410.

In this example, multiple sorting is carried out on the database data 300B according to attributes "Time" and "Device-id". It is first sorted by the attribute "Time" and then by the attribute "Device-id". The concatenation of the attributes "Time" and "Device-id", "Time_Device-id", is used as the row key in place of the original row key "Device-id" of the database data 300B. For example, the first column of the data replica 420, "2000.1.1_0001", is a value of the row key (Time_Device-id).

FIG. 4C schematically depicts another data replica 430 created according to an embodiment of the present invention.

Here it is assumed that the data replica 430 is used as the data replica 220_3 shown in FIG. 2. So the replica 430 is depicted as data sets 431 and 432 which respectively represent two parts of the data replica 220_3 stored in the nodes 230_5 and 230_6.

In this example, in creating the data replica 430, sorting is conducted on the database data 300B only by a single attribute "Temperature" and the attribute is used as the row key.

Figure 5:
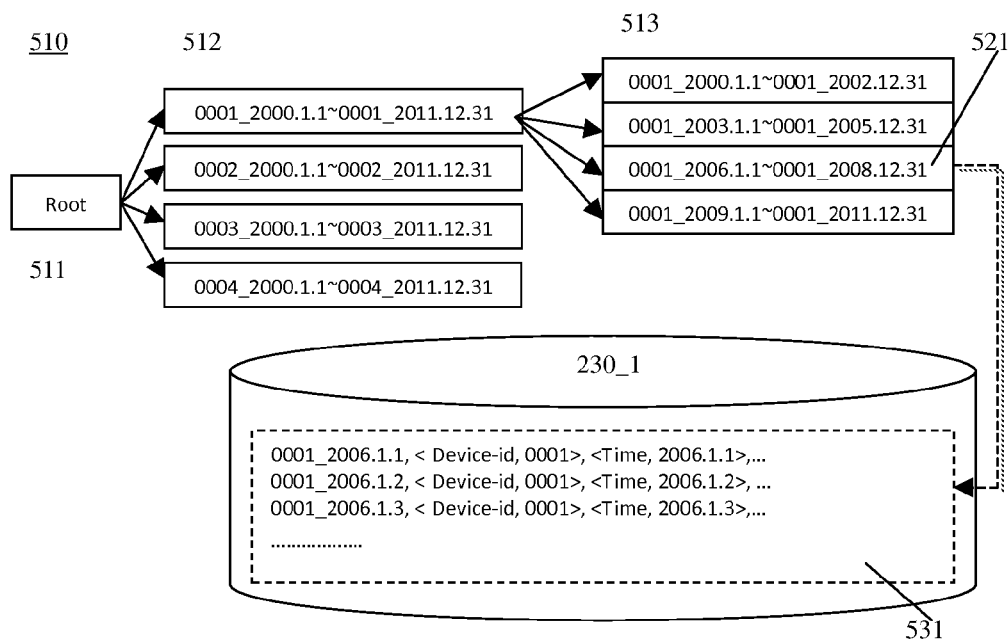
FIG. 5 illustratively depicts an index of a data replica in accordance with an embodiment of the present inventions.

The three data replicas 410,420 and 430 of the database data 300B and the manner in which they are created have been described above with reference to FIGS. 4A-4C. The three data replicas are examples of the data replica 220_1, 220_2 and 220_3 shown in FIG. 2. As indicated in previous description of the distributed database system 200 according to an embodiment of the invention, the data replicas 220_1, 220_2 and 220_3 each have a corresponding index 210_1, 210_2 and 210_3. Referring to FIG. 5, the structure of such an index will be described below by way of example.

FIG. 5 schematically depicts an index of a data replica created according to an embodiment of the present invention. What is indicated by reference mark 510 in FIG. 5 is just a part of index created on the data replica 410 according to the row key "Device-id_Time". As shown, the index 510 is a three-layer B+ tree structured index. Reference mark 511 indicates the root node in the first layer, reference mark 512 indicates a plurality of intermediate nodes in the second layer and reference mark 513 indicates a plurality of leaf nodes in the third layer. As shown, each intermediate node of the index 510 represents a range of data of the data replica 410. For example, "0001_2000.1.1-0001_2011.12.31" represents all the data of which the value of the row key falls into the range 0001_2000.1.1 to 0001_2011.12.31. Each leaf node of the index 510 represents a data block on the disk that can be quickly located and read out. For example, the leaf node 521 represents a data block on the disk in the computing node 230_1 that stores the data replica 410. With such B+ tree structured indices, desired data blocks in the storage may be quickly located in response to requests for data query, insertion, update, and deletion.

It is to be noted that those skilled in the art shall appreciate that the B+ tree index structure as shown in FIG. 5 is only an example of, rather than a limitation to, the index according to embodiments of the invention. Apparently, in implementing embodiments of the invention, other similar index structures may be employed.

Components of the distributed database system 200 and their implementations according to an embodiment of the present invention have been described above.

Figure 6:
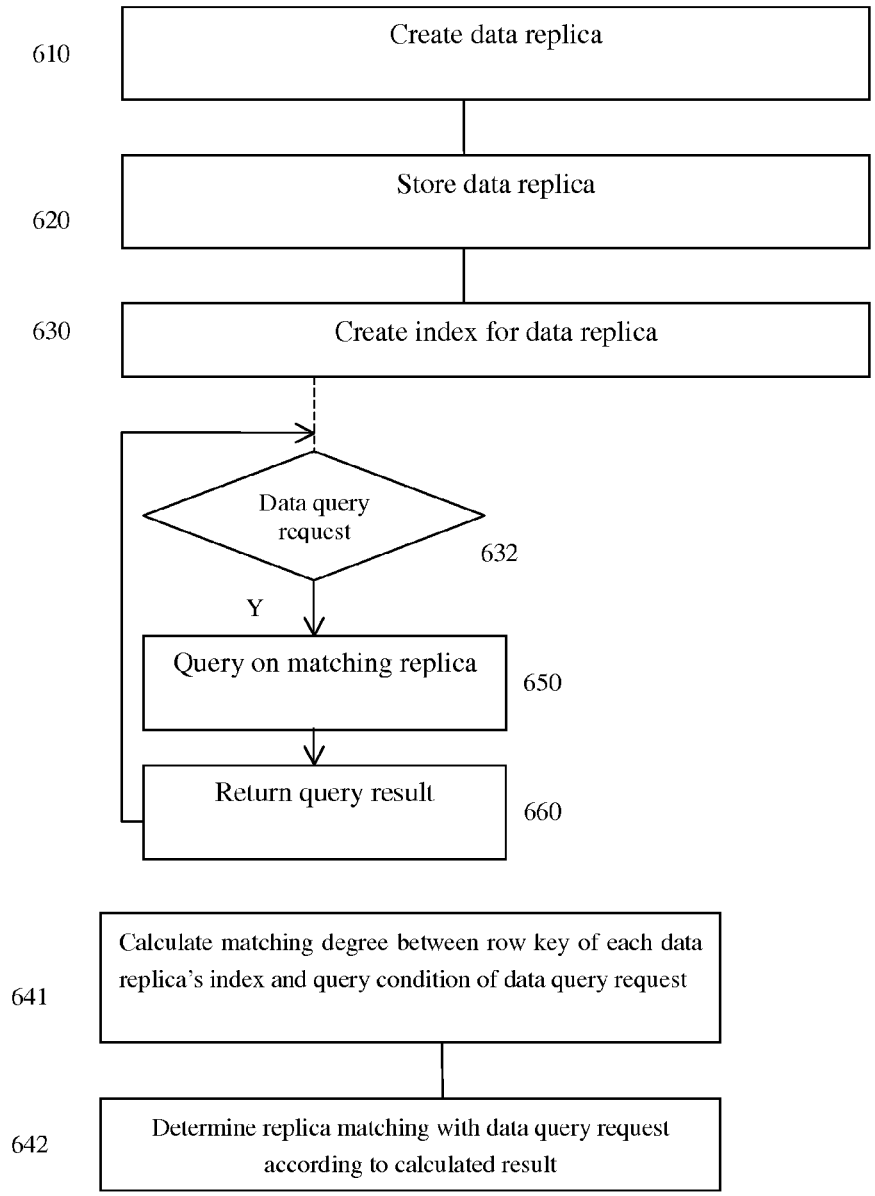
FIG. 6 schematically shows a flowchart of a method according to an embodiment of the present invention.

Refer now to FIG. 6, which schematically depicts a flow-chart of a method according to an embodiment of the present invention.

FIG. 6 shows a method for processing database data in a distributed database system. Here, the distributed database system comprises multiple computing nodes that are communicatively coupled via computer networks.

The processing of database data according to embodiment of the invention mainly pertains to a configuration phase and a query phase. As shown, in the instant embodiment, the process of processing distributed database data in the configuration phase comprises Steps 610 to 630.

It is assumed that initially a database system administrator has determined the number of data replicas and the scheme for configuring the data replicas on computing nodes based on available computing resources and requirements for application. For example, it is determined that three data replicas are needed, and the three data replicas will be allocated to nodes 230_1 and 230_2, nodes 230_3 and 230_4, and nodes 230_5 and 230_6.

In Step 610, data replicas are created for the database data, wherein a plurality of different data replicas are created for the database data, each of the data replicas being created in the following way:

sorting the database data according to at least one data attribute;

generating a row key based on the at least one data attribute; and using the sorted database data with the row key as the data replica.

The manner of creating a data replica for database data has been illustrated by way of example in previous paragraphs with reference to FIGS. 4A-4C. Thus, it is not repeatedly described here in detail.

According to an embodiment of the invention, multiple sorting may be carried out on the database data according to multiple data attributes. In that case, said generating a row key based on the at least one data attribute comprises using the concatenation of the multiple data attributes as the row key.

For example, in FIG. 3 it is shown that the row key of the database data 300B database is "Device-id". By carrying out multiple sorting on the data 300B according to two data attributes "Device-id" and "Time" and using the concatenation of the two attributes, "Device-id_Time", as the new row key to take the place of the original row key "Device-id", the data replica 410 is generated as a result.

In this case, the multiple sorting is carried out according to two attributes "Device-id" and "Time". However, the invention is not limited to that. In fact, multiple sorting may be conducted according to three or more attributes in the same way.

Of course, multiple sorting may be conducted on the database data according to a single data attribute; in this case, the row key is the data attribute.

According to an embodiment of the present invention, multiple sorting may be conducted preferentially according to frequently queried data attribute(s) so as to create a data replica. Taking the data 300B shown in FIG. 3 as example, according to historical recording of applications, "Device-id", "Time" and "Temperature" are attributes frequently being queried. Thus the attributes "Device-id" and "Time" and "Temperature" may be selected as the basis on which multiple sorting is carried out on the data 300B for generating a data replica.

After Step 610, the process proceeds to Step 620. In Step 620, different data replicas are stored into different computing nodes.

For example, as shown in FIG. 2, the data replica 410 is stored into the computing nodes 230_1 and 230_2. In addition, the data replica 420 is stored into the computing nodes 230_3 and 230_4, and the data replica 430 is stored into the computing nodes 230_5 and 230_6.

After Step 620, the process proceeds to Step 630.

In Step 630, an index is created by row key for each data replica. For example, the index 510 shown in FIG. 5 is created for the data replica 410 according to the row key "Device-id_Time" of the data replica 410. In addition, an index is created according to the row key "Time_Device-id" for the data replica 420, and an index is created according to the row key "Temperature" for the data replica 430. Taking the scenario shown in FIG. 2 for example, as a result of the execution of Step 630, indices 210_1, 210_2 and 210_3 are created for the data replicas 220_1, 220_2 and 220_3, respectively.

Each of the created indices contains mapping relationship between data items in the corresponding data replica and their positions in the computing node. Because data in different data replicas are sorted in different ways, each data replica's corresponded index is also different. According to an embodiment of the invention, each of the created indices will be stored, for example, in the master node of the distributed database system 200.

In accordance with an embodiment of the invention, after an index is created for a data replica, the association relationship between the index and the computing node storing its associated data replica is also stored. For example, the index 510 in FIG. 5 is associated with the computing nodes 230_1 and 230_2 that store the data replica 410. Through the stored association relationship, it may be convenient to identify on which computing node(s) an index's corresponding data replica resides.

After Step 630, the configuration phase is over, and the distributed database system 200 enters into a ready state. As shown in FIG. 2, at this time, the data replica 220_1 stored on the computing nodes 230_1 and 230_2 is the data replica 410 created in Step 620. The data replica 220_2 stored on the computing nodes 230_3 and 230_4 is the data replica 420 created in Step 620. The data replica 220_3 stored on the computing nodes 230_5 and 230_6 is the data replica 430 created in Step 620. And the indices 210_1, 210_2 and 230_3 created in Step 630 are also stored.

In the ready state, queries from an application may be accepted. According to an embodiment of the invention, in response to receiving a data query request as indicated by the decision block 632, the distributed database system 200 will carry out a query on a data replica that matches with the data query request (650), and returns the query result to the application initiating the data query request (660).

Because the system has stored data replicas sorted in different ways on different nodes, depending on different query conditions in the query request, it may carry out query on the data replica that matches with the data query request so as to improve querying speed.

For example, the query of a query request is:

Select Temperature where Device-id=0001 AND
    2009.1.1>Time>2006.1.1     (Query-1)

The data replica 410 matches with the query condition

"Device-id=0001 AND 2009.1.1>Time>2006.1.1"

in the Query-1. Therefore, the query is carried out on the data replica 410.

The query of a query request is:

Select Temperature where Device-id=*AND
    Time=2011.12.31     (Query-2)

The data replica 420 matches with the query condition

"Device-id=*AND Time=2011.12.31"

in the Query-2. Therefore, the query is carried out on the data replica 420.

The query of a query request is:

Select Humidity where Temperature>10     (Query-3)

The data replica 430 matches with the query condition

"Temperature>10"

in the Query-3. Therefore, the query is carried out on the data replica 430.

As shown, according to an embodiment of the invention, the step of carrying out query on a data replica that matches with the data query request comprises the following Steps 641 and 642.

In Step 641, a matching degree between the row key of each data replica's index and the query condition of the data query request is calculated.

The matching degree between the row key of a data replica's index with a query condition is defined as follows:

Matching degree=<the number of attributes commonly contained in the query request and in the index>/<the number of attributes contained in the row key> wherein, if the query condition contains a range of values of a particular attribute A and the row key also contains the attribute A, then, both will be deemed to be same only if the attribute A of the row key is located at the end of the row key.

For the Query-3, the query condition "Temperature>20" contains an attribute "Temperature". The matching degree between the row key (Device-id_Time) of the index of data replica 410 and the query condition is 0. The matching degree between the row key (Time_Device-id) of the index of data replica 420 and the query condition is 0. The matching degree between the row key (Temperature) of the index of the data replica 430 and the query condition is 3.

For the Query-1, the query condition is "Device-id=0001 AND 2009.1.1>Time>2006.1.1". The matching degree between the row key of the index of data replica 410 and the query condition is 1. The matching degree between the row key of the index of data replica 420 and the query condition is 0.5. The matching degree between the row key of the index of data replica 430 and the query condition is 0.

For the Query-2, the query condition is "Device-id=*AND Time=2011.12.31". The matching degree between the row key of the index of data replica 410 and the query condition is 0.5. The matching degree between the row key of the index of data replica 420 and the query condition is 1. The matching degree between the row key of the index of data replica 430 and the query condition is 0.

In Step 642, the data replica matching with the data query request is determined according to the result calculated.

According to an embodiment of the invention, a data replica corresponded to the row key of a data replica's index having the largest matching degree with the data query request is determined to be the data replica matching with the data query request.

For example, according to the result of Step 641, a query for the Query-1 is carried out on the data replica 410. In the distributed database system 200 shown in FIG. 2, that is equivalent to carrying out the query on the data replica 220_1 and, in this case, the query condition "Device-id=0001 AND 2009.1.1>Time>2006.1.1" will be converted to the query condition "0001_2009.1.1>row key AND row key>0001_2006.1.1". Referring to FIG. 5, the query condition "0001_2009.1.1>row key AND row key>0001_2006.1.1" is matched with the leaf node 521 of the index 510, so the position where the corresponding data block 531 is stored may be located rapidly. If there were not the index shown in FIG. 5, the querying process might spend longer time. Therefore, this example illustrates that using the data replica and index created according to embodiments of the invention may improve efficiency of querying. The effect would be particularly evident for multi-dimensional queries and multi-dimensional range queries.

In a similar manner, a query for the Query-2 is carried out on the data replica 420, and a query for the Query-3 is carried out on the data replica 430.

According to another embodiment of the present invention, for a certain query, if there are multiple row keys of indices of data replicas with the largest matching degree with a query condition, then the query may be carried out on any one of the data replicas corresponding to the row keys.

In the ready state, data updating may be carried out on the distributed database. According to an embodiment of the present invention, in response to receiving a request for data updating, each data replica and the index of each data replica are updated. The updating of data replica and index may be carried out in accordance with methods already known in the prior art for data updating on distributed databases, so there is no need to repeat detailed descriptions here.

Various embodiments of the method for processing database data in a distributed database system have been described above. Based on the same inventive concept, the invention also provides an apparatus for processing database data in a distributed database system.

Figure 7:
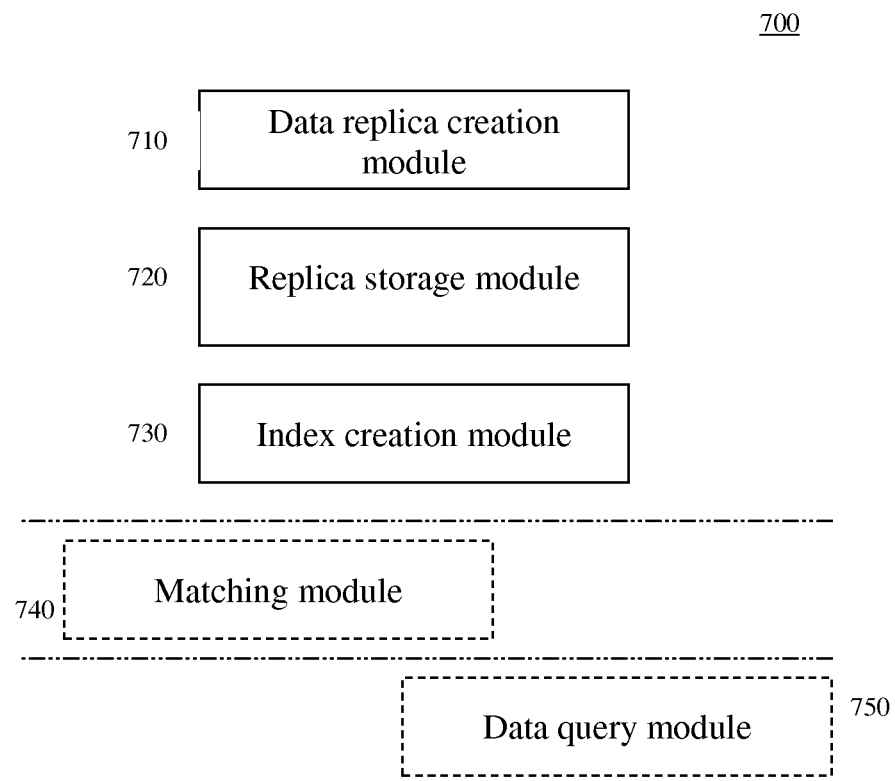
FIG. 7 schematically depicts a block diagram of an apparatus according to an embodiment of the present invention.

FIG. 7 schematically depicts an apparatus 700 for processing database data in a distributed database system according to an embodiment of the present invention.

The distributed database system 200 to which embodiments of the invention are applied comprises a plurality of computing nodes communicatively coupled via computer networks. As shown in FIG. 7, the apparatus 700 comprises a data replica creation module 710, a replica storage module 720 and an index creation module 730. The functionality and various embodiments of the modules are briefly described below.

The data replica creation module 710 is configured to create a plurality of different data replicas wherein each of the data replicas is created in the following way:

sorting the database data according to at least one data attribute;

generating a row key based on the at least one data attribute; and using the sorted database data with the row key as the data replica.

The replica storage module 720 is configured to store different data replicas in different computing nodes.

The index creation module 730 is configured to create an index for each of the data replicas according to its row key.

According to an embodiment of the invention, the data replica creation module 710 is configured to carry out multiple sorting on the database data according to multiple data attributes and use the concatenation of the multiple data attributes as the row key.

According to an embodiment of the present invention, the apparatus 700 further comprises a module (not shown) which is configured to store the index.

According to an embodiment of the present invention, the apparatus 700 further comprises a module (not shown) which is configured to store the association relationship between the index and the computing node storing its associated data replica.

According to an embodiment of the present invention, the device 700 further comprises a query module 750, which is configured to carry out a query on a data replica that matches with a data query request in response to receiving the data query request.

According to an embodiment of the present invention, the device 700 further comprises a matching module 740, which is configured to calculate a matching degree between the row key of each data replica's index and the query condition of the data query request, and determine the data replica matching with the data query request according to the result calculated.

According to an embodiment of the present invention, the matching module is configured to determine a data replica corresponded to the row key of a data replica's index having the largest matching degree with the data query request to be the data replica matching with the data query request.

According to an embodiment of the present invention, the apparatus 700 further comprises a data updating module (not shown), which is configured to update each data replica and the index of each data replica in response to receiving a request for data updating.

Embodiments of the apparatus for processing database data in a distributed database system are described above. Since embodiments of the method for processing database data in a distributed database system have been described in previous paragraphs, in the description of the apparatus, some duplicate contents in the description of the method for processing database data in a distributed database system are omitted.

Embodiments of the present invention utilize redundancy of a distributed database system to deploy different data replicas at multiple computing nodes, which is helpful in improving query performance, especially the efficiency of multi-dimensional data queries.

Embodiments of the invention have been described. The above description is only exemplary, rather than exhaustive or limited to the embodiments disclosed. Those skilled in the art shall appreciate that various modifications and alterations changes thereto may be readily made. The choice of terms herein is intended for best explaining the principle, practical application or improvement to the techniques in the market of the embodiments, or allowing those skilled in the art to understand various embodiments disclosed herein.

The invention claimed is:

1. A method for processing database data in a distributed database system, wherein the distributed database system comprises a plurality of computing nodes communicatively coupled via computer networks, the method comprising:
creating a plurality of different data replicas, wherein each of the data replicas is created in the following way:
(a) sorting the database data according to at least two data attributes, wherein the database data is sorted differently based on the data attributes for each of the data replicas;
(b) generating a row key based on the at least two data attributes; and
(c) using the sorted database data with the row key as the data replica;
storing different data replicas in different computing nodes; and
creating an index for each of the data replicas according to its row key;
wherein the at least two data attributes that are used as the basis for sorting of the database data comprise an attribute indicative of time and an attribute indicative of a device identifier;
wherein the sorting of the database data of a first one of the data replicas comprises first sorting the database data by the attribute indicative of the device identifier and then sorting the database data by the attribute indicative of the time; and
wherein the sorting of the database data of a second one of the data replicas comprises first sorting the database data by the attribute indicative of the time and then sorting the database data by the attribute indicative of the device identifier.

2. The method of claim 1, further comprising generating a row key using the concatenation of the at least two data attributes as the row key.

3. The method of claim 1, further comprising: storing the index and an association relationship between the index and a computing node of the plurality of computing nodes storing its associated data replica.

4. The method of claim 3, further comprising: carrying out a query on a data replica that matches with a data query request in response to receiving the data query request.

5. The method of claim 4, further comprising:
calculating a matching degree between the row key of each data replica's index and a query condition of the data query request; and
determining the data replica matching with the data query request according to the calculated matching degree.

6. The method of claim 5, wherein a data replica corresponding to the row key of a data replica's index having the largest matching degree with the data query request is determined to be the data replica matching with the data query request.

7. The method of claim 1, further comprising: in response to receiving a request for data updating, updating each data replica and the index of each data replica.

8. The method of claim 1, wherein the database data is non-relational database data.

9. An apparatus for processing database data in a distributed database system, wherein the distributed database system comprises a plurality of computing nodes communicatively coupled via computer networks, the apparatus comprising:
a processor; and
a memory storing computer readable instructions that, when executed by the processor, implement:
a data replica creation module, configured to create a plurality of different data replicas wherein each of the data replicas is created in the following way:
(a) sorting the database data according to at least two data attributes, wherein the database data is sorted differently based on the data attributes for each of the data replicas;
(b) generating a row key based on the at least two data attribute; and
(c) using the sorted database data with the row key as the data replica;
a replica storage module, configured to store different data replicas in different computing nodes; and
an index creation module, configured to create an index for each of the data replicas according to its row key;
wherein the at least two data attributes that are used as the basis for sorting of the database data comprise an attribute indicative of time and an attribute indicative of a device identifier;
wherein the sorting of the database data of a first one of the data replicas comprises first sorting the database data by the attribute indicative of the device identifier and then sorting the database data by the attribute indicative of the time; and
wherein the sorting of the database data of a second one of the data replicas comprises first sorting the database data by the attribute indicative of the time and then sorting the database data by the attribute indicative of the device identifier.

10. The apparatus of claim 9, wherein the data replica creation module is configured to use the concatenation of the at least two data attributes as the row key.

11. The apparatus of claim 9, wherein the computer readable instructions, when executed by the processor, further implement:
a module configured to store the index and an association relationship between the index and a computing node of the plurality of computing nodes storing its associated data replica.

12. The apparatus of claim 11, further comprising: a query module configured to carry out a query on a data replica that matches with a data query request in response to receiving the data query request.

13. The apparatus of claim 12, wherein the computer readable instructions, when executed by the processor, further implement a matching module configured to:
calculate a matching degree between the row key of each data replica's index and a query condition of the data query request; and
determine the data replica matching with the data query request according to the calculated matching degree.

14. The apparatus of claim 13, wherein the matching module is configured to determine a data replica corresponding to the row key of a data replica's index having the largest matching degree with the data query request to be the data replica matching with the data query request.

15. The apparatus of claim 9, wherein the computer readable instructions, when executed by the processor, further implement a data updating module configured to update each data replica and the index of each data replica in response to receiving a request for data updating.

16. The apparatus of claim 9, wherein the database data is non-relational database data.

\* \* \* \* \*